United States Patent [19]

Myeress

[11] 3,879,132
[45] Apr. 22, 1975

[54] ALIGNMENT APPARATUS FOR A LIGHT BEAM GENERATOR

[75] Inventor: Rudolph S. Myeress, Richmond Heights, Ohio

[73] Assignee: Allied Steel and Tractor Products, Incorporated, Cleveland, Ohio

[22] Filed: Aug. 20, 1973

[21] Appl. No.: 389,947

[52] U.S. Cl. .................. 356/153; 33/1 H; 33/227; 61/72.1
[51] Int. Cl. .......................................... G01b 11/26
[58] Field of Search................ 356/153; 331/94.5 A; 33/1 H, 227, 286, 275; 61/72.1, 72.4

[56] References Cited
UNITED STATES PATENTS

| | | | |
|---|---|---|---|
| 3,588,255 | 6/1971 | Alexander | 356/153 |
| 3,612,700 | 10/1971 | Nelson | 356/153 |

Primary Examiner—Ronald L. Wibert
Assistant Examiner—Paul K. Godwin
Attorney, Agent, or Firm—Lyon & Lyon

[57] ABSTRACT

An alignment apparatus to be used with a light beam generator for alignment measurements in tunnel and pipeline construction and the like. The apparatus includes an adjustable support base for positioning the apparatus in an aligned position in the construction site. A support is provided on this base for the light beam generator equipment. The portion of the base to which the beam generator support is affixed is capable of pivoting about a first axis generally perpendicular to the intended beam path. A lateral offset is provided which is fixed on one end to pivot with the support base about the axis of the support base and is capable of supporting a rod at a displaced position from the support base wherein the longitudinal axis of the rod is parallel to the pivot axis of the base. A telescope may be mounted to the rod at a convenient position above the construction in order that the entire system may be aligned by visually aligning the telescope.

9 Claims, 7 Drawing Figures

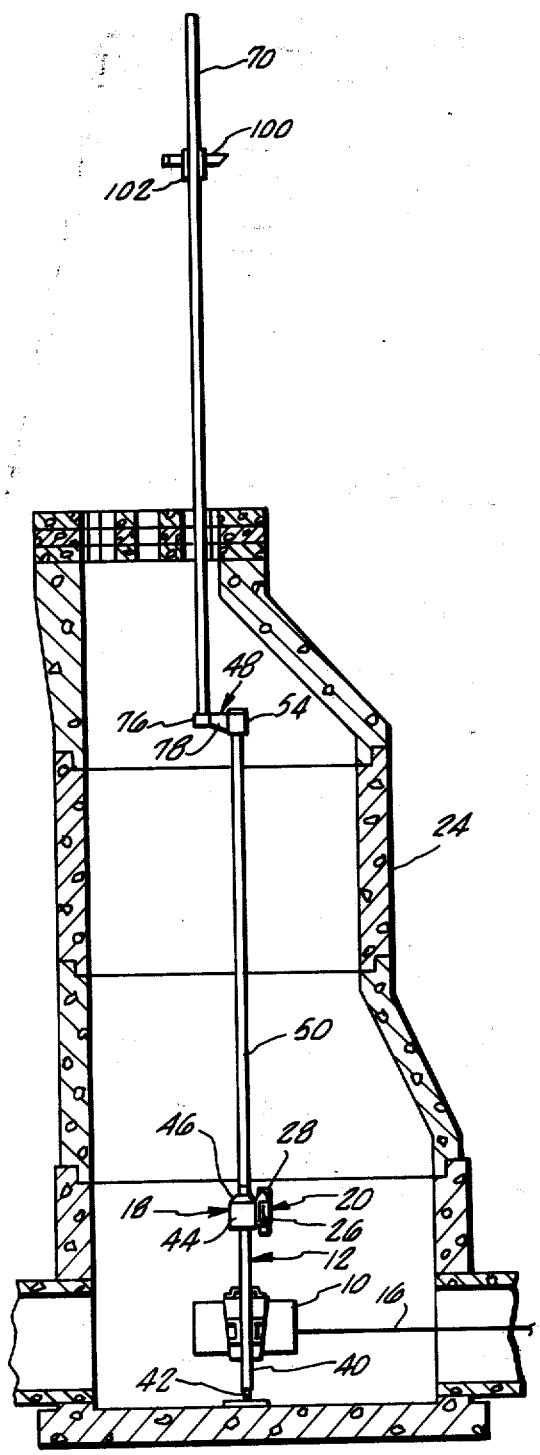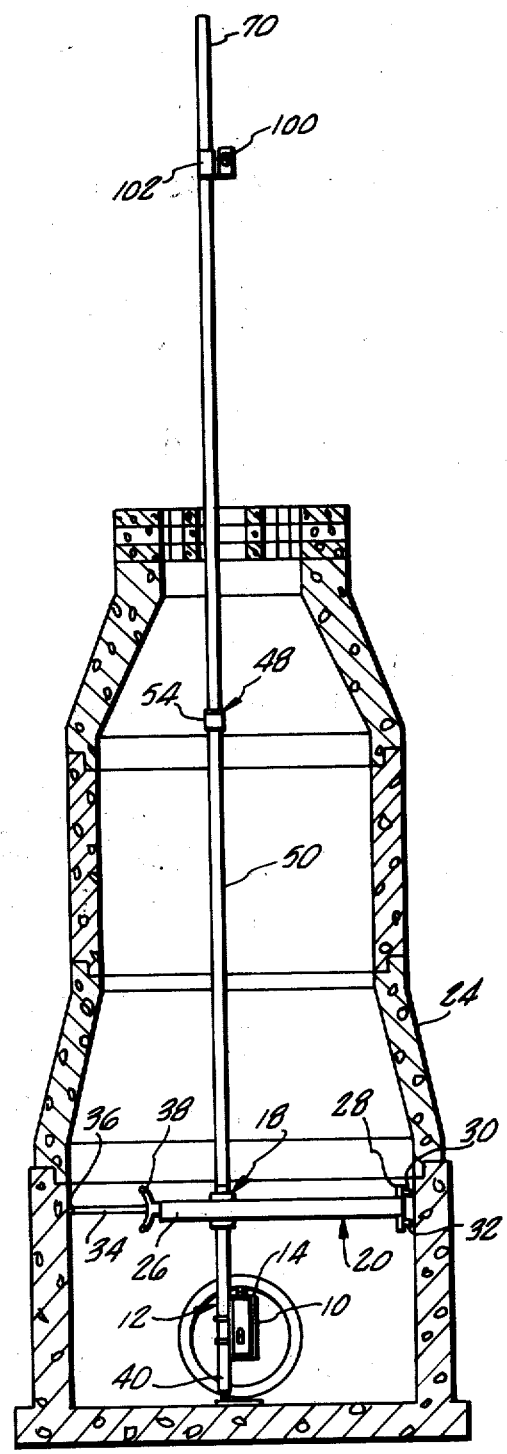

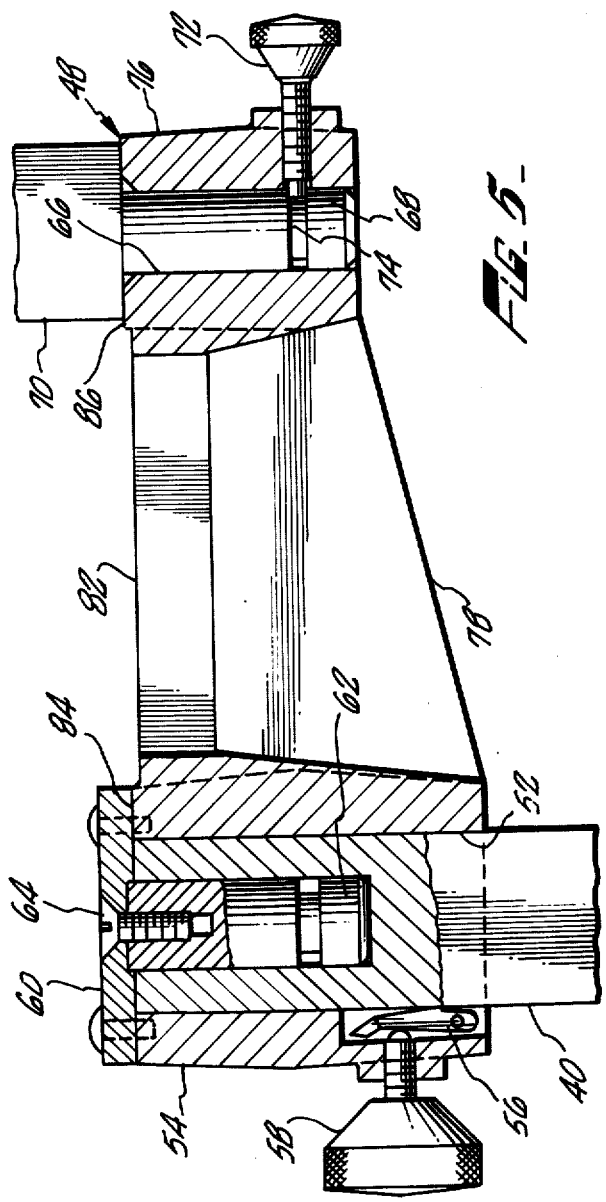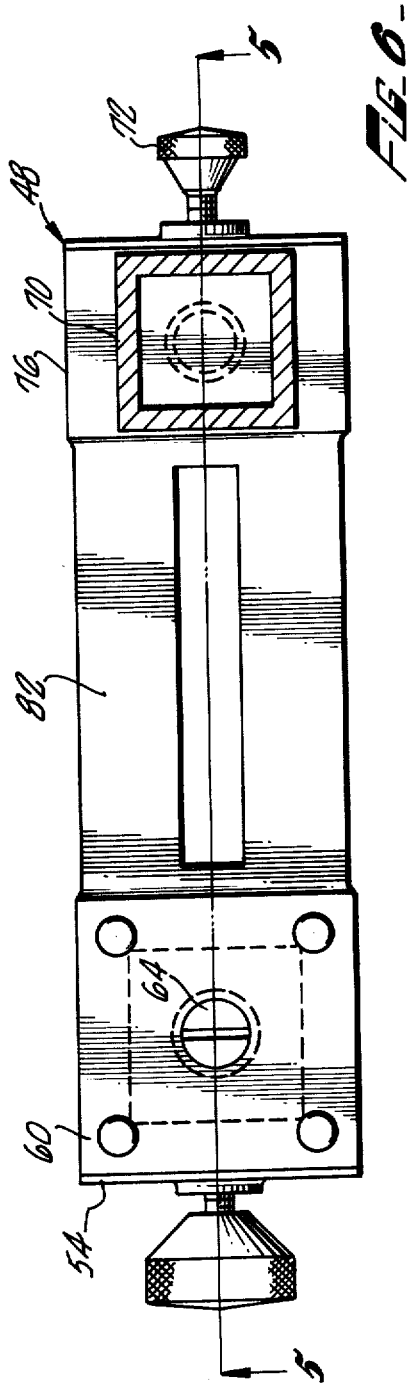

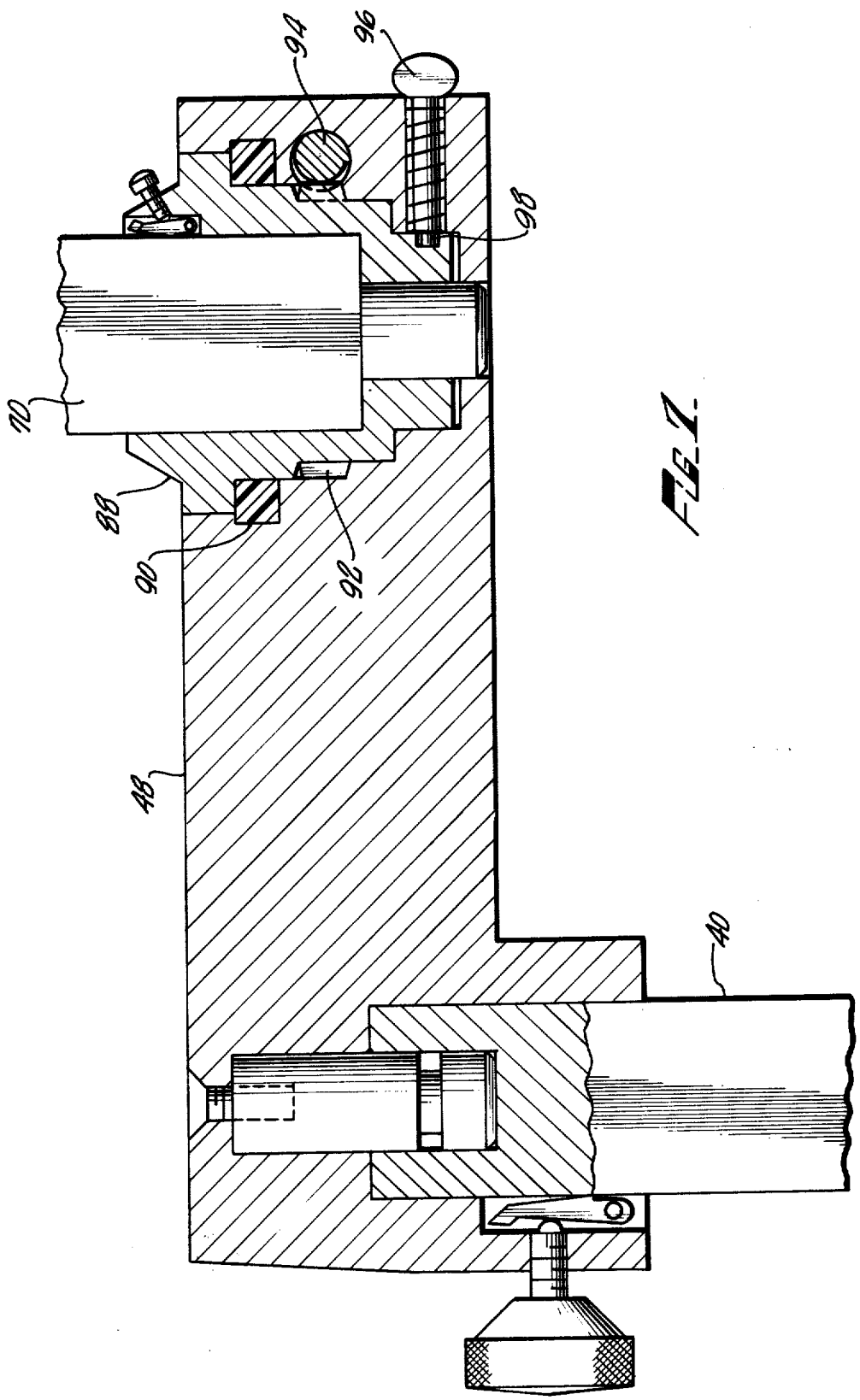

ALIGNMENT APPARATUS FOR A LIGHT BEAM GENERATOR

This invention relates to construction measurement devices. More specifically, this invention is directed to an alignment apparatus for a light beam generator.

Light beam generators, particularly with the advent of the laser, have been used as alignment devices in the construction industry. Such devices are specifically useful for pipelines, sewer lines, tunnels and the like. Ordinarily a target is placed within a pipe section which is in turn positioned within the construction and aligned relative to some reference. The beam generator is positioned at or near the reference so that it will be aligned with the target in the pipe section when the pipe section is properly placed.

In order that the light beam generator can be employed for accurate measurements, a procedure must be available for first accurately aligning the light beam generator. One such system incorporates a transit mounted telescope located above the construction site. The telescope is then visually aligned with a surveyors rod or other bench mark representing the projected path of the pipeline. The telescope is then dropped and the light beam generator is aligned so that the light beam is aligned with the line of sight of the telescope. This method is accurate only when the intersection between the telescope line of sight and the light beam is at a distance from the light beam generator. Thus, the light beam generator is preferably placed at a distance behind the first aligned pipe through which the beam may go.

Another system has employed the use of an apparatus which directly couples the light beam generator to the telescopic sight in order that a permanent alignment is achieved. As a result, it is not required that the telescope be in a direct line of sight with the light beam generator. However, the linkage between the light beam generator and the telescope has been such that the telescope support has been aligned with the pivot axis of the light beam generator. This vertical alignment is often disadvantageous because of the frequent use of these alignment mechanisms within pipes and down in manholes. When it is desired that such a device be used within a pipe, a portion of the rim must commonly be broken out to allow clearance for the vertical rod aligned with the pivot axis of the light beam generator support. With manholes, it is quite often desirable that the light beam generator not be placed directly under the access hole thereto or that the rod extending out of the manhole be displaced to one side thereof in order that the telescope can be conveniently reached without hanging over the hole.

The present invention employs a lateral offset which is preferably in a plane parallel to the light beam and extends laterally to receive a standard calibrated rod upon which the telescope is mounted. Thus, the support base for the beam generator may be positioned in a pipe with the calibrated rod extending upward to receive the telescope at a laterally displaced position outside of the pipe. As a result, the pipe rim need not be broken. Similar advantages are obtained when using the present system in manholes. If this offset is such that the telescope remains in a plane common to the light beam, the sighting capabilities of the apparatus are not impaired. Further, with the present invention, the rotational position of the telescope relative to the azimuth of the light beam is preserved.

The present system may be employed with standard calibrated rods. The offset is designed to laterally displace these rods without displacing them vertically. Consequently, it is possible to reference the height of the light beam generator relative to the ground level or other reference. Further, the vertical axis defined by the base when properly placed and leveled is maintained in the rod extending upward from the apparatus by the offset device for proper placement of the telescope relative to the light beam generator.

Accordingly, it is an object of the present invention to provide an alignment apparatus for a light beam generator wherein the telescope support and telescope are displaced laterally from the pivot axis of the light beam generator.

Another object of the present invention is to provide an alignment apparatus for a light beam generator which can be placed within a structure where immediate vertical access is not available.

A further object of the present invention is to provide an alignment apparatus for a light beam generator wherein a reference rod extending vertically from the light beam generator is displaced horizontally to remain parallel with the axis of the support base and retain the reference height of the base. Other and further objects and advantages of the present invention will be made readily apparent from the following detailed description and accompanying drawings.

FIG. 3 illustrates the placement of the present invention in a manhole having a restriction therein.

FIG. 4 is an end view of the placement of FIG. 3.

FIG. 5 is a cross-sectional side view of the lateral offset portion of the present invention taken along line 5—5 of FIG. 6.

FIG. 6 is a top view of the lateral offset portion of the present invention.

FIG. 7 is a second embodiment of the lateral offset portion of the present invention with an optional journal for pivoting the telescope relative to the offset.

Figure 1:
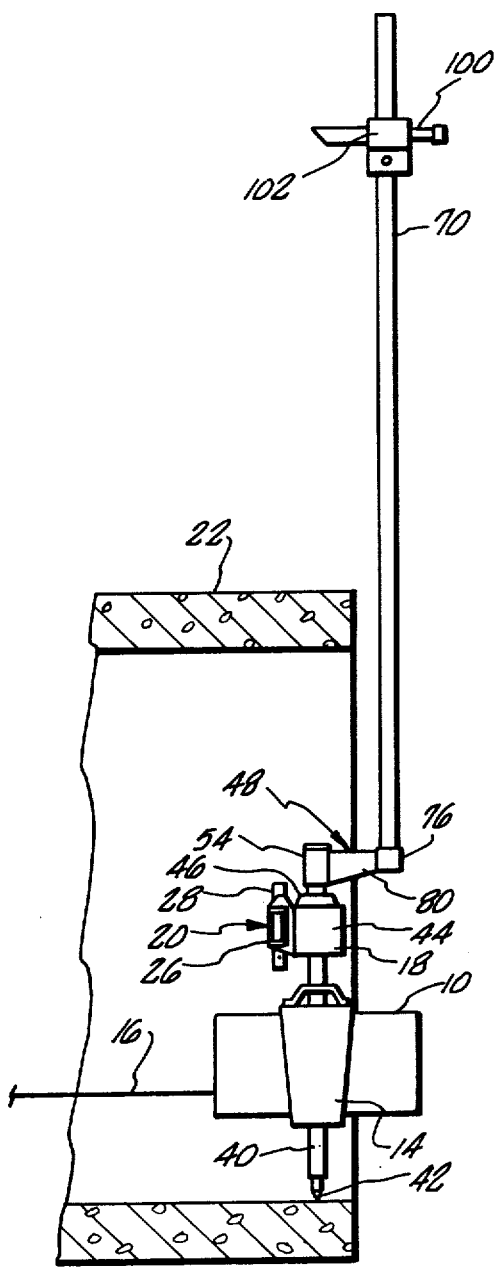
FIG. 1 is a side view of the assembled apparatus shown positioned within a pipe which is broken away for clarity.

Turning specifically to the drawings, a light beam generator 10 is shown mounted to a pivotal support generally designated 12. The light beam generator 10 may be any one of several commercially available low intensity laser beam generators. Such generators often include a mounting bracket 14 which allows angular elevation changes of the light beam generator 10 relative to the mounting bracket 14 but does not allow changes in azimuth. The mounting bracket 14 is rigidly locked to the pivotal support 12 to positively retain the angular azimuth determined by the pivotal support 12. A light beam 16 is illustrated in FIG. 1 as extending from the light beam generator 10 in an aligned path.

The pivotal support 12 includes an aligner 18, an adjustable manhole cross brace 20 and a base support rod 40. The adjustable manhole cross brace 20 establishes the position of the aligner 18 and in turn the overall pivotal support 12 within the construction site such as pipe 22 or manhole 24. The adjustable manhole cross brace 20 includes a sleeve 26 having an anchoring bracket 28 with two anchoring points 30 and 32. The use of two anchoring points 30 and 32 prevents rotation of the sleeve 26 during manipulation and placement of the cross brace 20 once the points 30 and 32 have been positioned against the wall of the construction site such as pipe 22 or manhole 24. A threaded rod 34 is positioned within the sleeve 26. One end of the threaded rod 34 provides a single anchoring point 36 for locking the cross brace 20 within the construction site. The anchoring point 36 is opposite the anchoring points 30 and 32 to provide a stable brace. An adjuster nut 38 is threaded onto the threaded rod 34 for forcing the rod 34 outwardly away from the sleeve 26 and into compression against the sides of the pipe 22. Thus, the aligner 18 may be fixed within the pipe 22 or manhole 24. The lateral position of the aligner 18 may be established once the manhole cross brace 20 is positioned. A releasable clamp allows such adjustment and also functions to fix the selected position of the aligner.

The aligner 18 establishes a fixed pivot axis for base support rod 40. Base support rod 40 extends downwardly from the aligner 18 to a support point 42. The support point 42 provides a point contact with the pipe 22 or the floor of the manhole 24 in order that the base support rod 40 might pivot easily on that point. The base support rod 40 is most conveniently square in cross section in order that it might properly interface with standardized equipment normally employed with square calibrated rods. Base support rod 40 may also be calibrated thereby giving an easy reference for determining the position of the light beam generator 10 relative to either end of the support rod 40.

In order that the adjustable manhole cross brace 20 can be vertically adjustable, the aligner 18 is preferably slidable on the base support rod 40. The aligner 18 and the adjustable manhole cross brace 20 can first be positioned within the site. The base support rod 40 is then lowered until it encounters the floor of the site. The base support rod 40 may or may not be then locked to the aligner 18. When the base support rod 40 is not locked to the aligner 18, the cross brace is not subjected to substantial vertical loads. Rather, the base support rod 40 supports on point 42 the weight of the system. The aligner 18 and cross brace 20 do provide lateral support to the system and may be capable of being locked to provide azimuth control of the light beam generator 10. The aligner 18 may include an outer housing 44 and a journal 46. The journal 46 is provided with a square hole symetrically positioned therethrough for receiving the base support rod 40.

Figure 2:
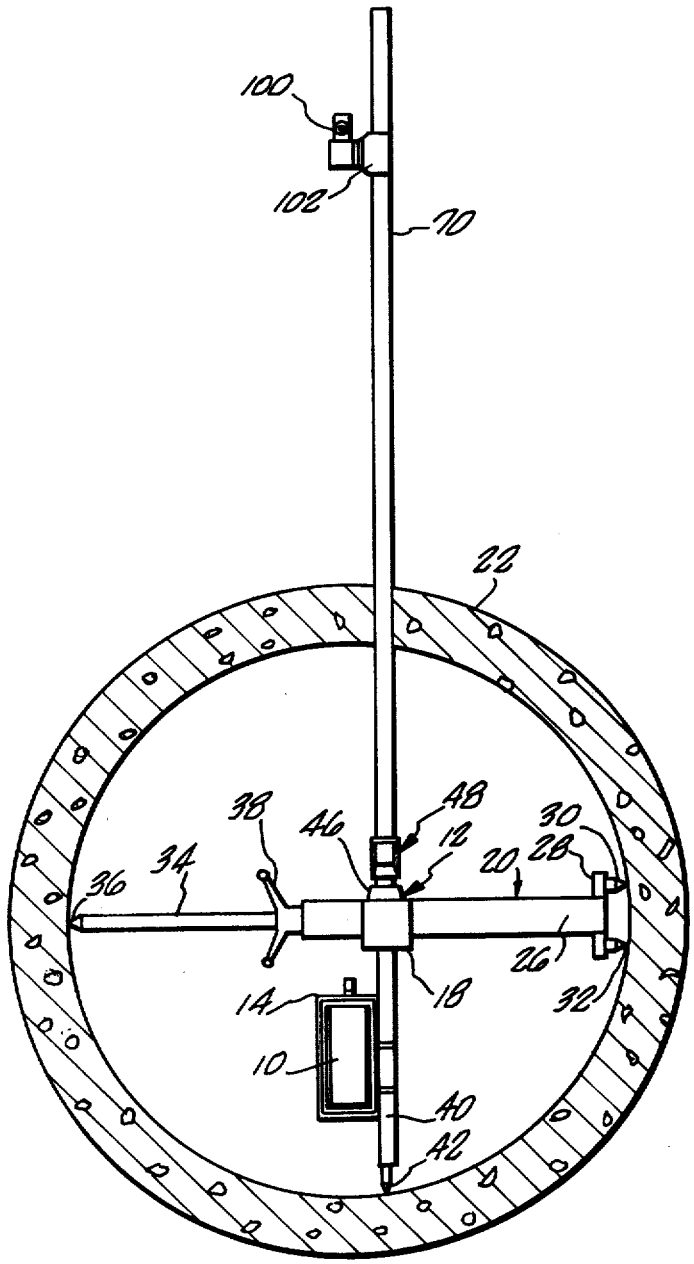
FIG. 2 is a back view of the present invention illustrating the relative positioning of the telescope and laser with the apparatus positioned in a pipe.

Above the base support rod 40, there is a lateral offset means generally designated 48. The lateral offset means 48 may be positioned directly on the base support rod 40 as shown in FIGS. 1 and 2 or positioned above a standard calibrated rod 50 which is in turn positioned on the base support rod 40 to become an extension of the pivotal support as illustrated in FIGS. 3 and 4. The lateral offset means 48 includes a first socket 52 for receiving the upper end of the base support rod 40 or a standardized calibrated rod 50 positioned on the base support rod 40. Standardized calibrated rods used in the industry are square and are of a specific design including female and male ends for coupling the rod lengths. As a result, the first socket 52 conforms to this standardized configuration to accept the standard calibrated rod 50 as well as the base support rod 40. Both the standard calibrated rod 50 and the base support rod 40 include a standardized female end. The first socket 52 is located within first offset block 54. A clamp 56 is positioned to retain the base support rod 40 within the offset block 54. A locking knob 58 cooperates with clamp 56 to hold the rod 40 in place. Located above the first socket 52 on the offset block 54 is a plate 60. The plate 60 is secured to the offset block 54 and defines one end of the first socket 52. A male connector 62 is secured at a central position on the plate 60 by cap screw 64. The male connector 62 receives the upper end of the base support rod 40 or standard calibrated rod 50.

The lateral offset means 48 further includes a second socket 66 which is laterally displaced from the first socket 52. The second socket 66 is designed to receive the male connector 68 of a calibrated rod 70. A locking knob 72 is positioned to engage locking groove 74 to prevent extraction of the calibrated rod 70.

The second socket 66 is set within a second offset block 76 which is rigidly positioned relative to the first offset block 54. Side members 78 and 80 are provided between the offset blocks 54 and 76 to establish this fixed relative position. A strengthened section 82 is provided at the upper portion of each side member 78 and 80 to add structural rigidity and strength. The side members 78 and 80 may be of any structurally acceptable length and several such offsets may be carried to fit various offset requirements.

The offset 48 is designed so that the sockets 52 and 66 have parallel centerlines. As a result, the base support rod 40 and the calibrated rod 70 will remain parallel when positioned within the lateral offset means 48. Further, joint 84 between the offset block 54 and the plate 60 defines a plane perpendicular to the centerlines of the sockets 52 and 66. The upper surface 86 of the second offset block 76 is also within that plane. Consequently, the upper surface of the base support rod 40 is at the same height as the lower end of the calibrated rod 70. Therefore, calibrations on the base support rod add directly to the calibrated rod 70 for height calculations.

Placement of the lateral offset means 48 is shown in two embodiments in FIGS. 1 through 4. In both applications, the offset is shown avoiding an obstacle presented above the position of the light beam generator 10. The offset may also function to establish the calibrated rod 70 at a more convenient location near the edge of a manhole or the like so that the operator need not place a board over the manhole or otherwise extend himself unnaturally to use the system.

An alternate embodiment is illustrated for the lateral offset means 48 in FIG. 7. In FIG. 7 a journal 88 is positioned within the body of the lateral offset means 48 for receiving the calibrated rod 70. The journal 88 is set within the housing on a journal bearing 90. A gear 92 is also placed about the journal 88. The gear 92 engages worm 94 which may be rotated to rotate the calibrated rod 70. Thus, the offset position of the calibrated rod 70 may be fixed while at the same time allowing rotation of the calibrated rod 70 at this fixed location. A detent 96 may cooperate with one or more holes 98 at selected positions of the rod 70.

The rod 70 extends upwardly from the construction site to a position preferably above the site in order that the operator might approach the upper end of the rod 70 where the intended reference position is in a direct line of sight. In order that a high degree of accuracy may be achieved with the system, a sight means such as a telescope 100 is mounted on the upper end of the calibrated rod 70. The telescope 100 includes a bracket 102 which rigidly aligns the telescope 100 relative to the square sides of the calibrated rod 70. Thus, when the telescope is aligned with the intended reference position, the light beam generator 10 is positioned so that the light beam 16 will travel in the direction intended.

In order that greater accuracy may be introduced into the system, the telescope 100 is displaced by the bracket 102 from the calibrated rod 70 so that the line of sight of the telescope is directly above the line of sight of the light beam 16. This will occur when the offset means 48 projects either forward or backward from the base support rod 40. This positioning can best be seen in FIGS. 1 through 4. The telescope is thereby laterally aligned above the generator. However, the telescope is displaced either forward or rearward from the attachment point of the light beam generator 10 to the base support rod 40. This positioning has no effect on the azimuth control of the system.

Thus, an alignment apparatus for a light beam generator is disclosed which includes a lateral offset that does not affect the azimuth determination of the unit. Further, the height of the telescope 100 above the light beam generator 10 may be easily calculated because of the truly horizontal offset. Having fully described the invention, it would be apparent to those skilled in the art that many more modifications are possible without departing from the inventive concepts herein described. The invention, therefore, is not to be restricted except by the spirit of the appended claims.

What is claimed is:

1. An alignment apparatus for a light beam generator used for construction measurement, comprising
    a rod;
    sight means for aligning said rod relative to a distant selected point, said sight means being rigidly positionable on said rod;
    a pivotal support defining a pivot axis, said pivotal support being positionable relative to the ground, said pivotal support including means for fixing the light beam generator relative to said sight means; and
    a lateral offset means for fixing said rod relative to said pivotal support at a laterally displaced position from the pivot axis of said pivotal support.

2. The apparatus of claim 1 wherein said sight means is a telescope, said telescope having a line of sight in a vertical plane common to the beam path of the light beam generator.

3. The apparatus of claim 1 wherein said pivotal support includes a cross brace, a journal operably attached to said cross brace, and a base support rod capable of being slidably positioned within said journal, said pivotal support thereby allowing pivotal movement of said base support rod about the axis of said base support rod.

4. The apparatus of claim 3 wherein the beam generator is capable of being rigidly attached to said base support rod to pivot therewith.

5. The apparatus of claim 1 wherein said lateral offset means includes a first socket capable of coupling with said pivotal support and a second socket capable of accepting said rod.

6. The apparatus of claim 1 wherein said lateral offset means is capable of positioning said rod parallel to the pivot axis of said pivotal support.

7. The apparatus of claim 1 wherein said lateral offset means is capable of positioning said rod relative to said pivotal support so that the lower end of said rod and the top of said pivotal support are in the same horizontal plane.

8. An alignment apparatus for a light beam generator used for construction measurement, comprising
    a rod;
    sight means for aligning said rod relative to a distant selected point, said sight means being rigidly positionable on said rod;
    a structural support member, said structural support member being rigidly positionable relative to the ground;
    a journal capable of being locked to said structural support member, said journal defining a vertical pivot axis when positioned to said structural support member;
    a base support rod capable of being slidably mounted vertically in said journal, said base support rod being capable of accepting the light beam generator; and
    a lateral offset including a first socket for fixing said lateral offset to the top of said base support rod and a second socket for accepting said rod, said lateral offset being capable of positioning said rod parallel to said base support rod whereby the bottom of said rod lies in a plane common with the top of said base support rod.

9. An alignment apparatus for a light beam generator used for construction measurement, having a rod, sight means for aligning said rod relative to a distant selected point, said sight means being rigidly positionable on said rod, a pivotal support, said pivotal support being positionable relative to the ground, said pivotal support including means for fixing the light beam generator relative to said sight means, wherein the improvement comprises a lateral offset for fixing said rod relative to said pivotal support at a laterally displaced position from the pivot axis of said pivotal support, said offset being capable of positioning said rod parallel to said pivot axis of said pivotal support and said lateral offset being capable of positioning said rod relative to said pivotal support so that the lower end of said rod and the top of said pivotal support are in the same horizontal plane.

* * * * *